United States Patent
Kim et al.

(10) Patent No.: US 8,935,711 B2
(45) Date of Patent: *Jan. 13, 2015

(54) GLOBAL API DEPLOYMENT AND ROUTING

(71) Applicant: Microsoft Corporation, Redmond, WA (US)

(72) Inventors: Jacob Dongju Kim, Issaquah, WA (US); Jason Michael Blankman, Kirkland, WA (US); John Peter Bruno, Jr., Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,483

(22) Filed: May 1, 2013

(65) Prior Publication Data

US 2013/0254266 A1    Sep. 26, 2013

Related U.S. Application Data

(63) Continuation of application No. 12/046,450, filed on Mar. 12, 2008, now Pat. No. 8,458,733.

(51) Int. Cl.
*G06F 9/54* (2006.01)
*H04L 29/08* (2006.01)
(Continued)

(52) U.S. Cl.
CPC ... *H04L 67/10* (2013.01); *G06F 9/44* (2013.01); *H04L 67/1008* (2013.01); *H04L 67/18* (2013.01); *G06F 9/5033* (2013.01); *H04W 4/02* (2013.01)
USPC .......................................................... 719/330

(58) Field of Classification Search
CPC .................................................. H04L 67/1021
USPC ................................................ 719/328, 330
See application file for complete search history.

(56) References Cited

U.S. PATENT DOCUMENTS 6,253,257 B1    6/2001    Dundon
6,549,937 B1    4/2003    Auerbach et al.
(Continued)

OTHER PUBLICATIONS

Ma, W. ; Bedner, I.; Chang, G.; Kuchinsky, A.; Zhang, H., "Framework for Adaptive Content Delivery in heterogeneous Network Environments." Proc. SPIE 3969, Multimedia Computing and Networking 2000 (Dec. 27, 1999), pp. 86-100 [retrieved from http://citeseerx.ist.psu.edu/viewdoc/download?doi=10.1.1.85.3578&rep=rep1-&type=pdf], 15 pages.

(Continued)

*Primary Examiner* — H S Sough
*Assistant Examiner* — Brian W Wathen
(74) *Attorney, Agent, or Firm* — Bryan Webster; David Andrews; Micky Minhas

(57) ABSTRACT

A method and a system are provided for implementing a global application program interface and providing routing to a number of services. A global traffic manager may receive an application program interface call from an originating processing device via an open public network. The global traffic manager may return an address of a closest edge server, with respect to the originating processing device, from among a number of edge servers, in an edge network. The edge server may obtain a location having data corresponding to the application program interface call and may make a data specific application program interface call to a data center corresponding to the obtained location. The edge server may receive data from the data center and may ensure that the data is in a proper format. The edge server may send the data to the originating processing device via the open public network.

20 Claims, 6 Drawing Sheets

(51) Int. Cl.
*G06F 9/44* (2006.01)
*G06F 9/50* (2006.01)
*H04W 4/02* (2009.01)

(56) References Cited

U.S. PATENT DOCUMENTS

| | | |
|---|---|---|
| 6,714,968 B1 | 3/2004 | Prust |
| 6,754,699 B2 | 6/2004 | Swildens et al. |
| 7,143,444 B2 | 11/2006 | Porras et al. |
| 7,194,522 B1 | 3/2007 | Swildens et al. |
| 2002/0009079 A1* | 1/2002 | Jungck et al. ............ 370/389 |
| 2002/0065938 A1* | 5/2002 | Jungck et al. ............ 709/246 |
| 2005/0027797 A1 | 2/2005 | San Andres et al. |
| 2006/0112176 A1 | 5/2006 | Liu et al. |
| 2006/0146820 A1* | 7/2006 | Friedman et al. ......... 370/390 |
| 2006/0253609 A1* | 11/2006 | Andreev et al. .......... 709/245 |
| 2007/0156845 A1 | 7/2007 | Devanneaux et al. |
| 2007/0211690 A1 | 9/2007 | Van Megen et al. |
| 2007/0250560 A1 | 10/2007 | Wein et al. |
| 2007/0250839 A1 | 10/2007 | Van Der Sanden et al. |
| 2007/0271385 A1 | 11/2007 | Davis et al. |
| 2008/0008089 A1 | 1/2008 | Bornstein et al. |
| 2008/0216097 A1* | 9/2008 | Quinn et al. ............. 719/328 |

OTHER PUBLICATIONS

Rutschlin, et al., ".Net—All New?", retrieved on Dec. 18, 2007 at http://66.102.1.104/scholar?hl=en&lr=&q=cache:S4K8sFGry-QJ:www.informatik-.uni-stuttgart.de/ipvr/as/personen/ruetschlin/publications/SSGRR2002s.pdf+-%22global+API%22, pp. 1-8.
Vinoski, "Integration with Web Services", IEEE Internet Computing, IEEE Computer Society, Nov.-Dec. 2003, IEEE, 2003, pp. 75-77.

* cited by examiner

GLOBAL API DEPLOYMENT AND ROUTING

CROSS-REFERENCE TO RELATED APPLICATION(S)

This application is a continuation application of U.S. patent application Ser. No. 12/046,450, filed on Mar. 12, 2008, now U.S. Pat. No. 8,458,733, issued Jun. 4, 2013, and entitled "GLOBAL API DEPLOYMENT AND ROUTING". The afore-referenced application is hereby incorporated by reference.

BACKGROUND

A set of services may be accessed via a network by application program interfaces (APIs) using standard protocols. A delivery model for the set of services may use different service architectures, different uniform resource indicators (URIs), and may be hosted in different geographically distributed data centers. The delivery model has a number of disadvantages, such as:

forcing developers to understand multiple URIs;
   making geographic scaling of API services difficult;
   lack of flexibility with respect to enabling additional services to onboard new APIs;
   making scaling in a cost-effective manner difficult; and
   making access to markets difficult where network performance is poor.

Further, when user data is stored and managed in multiple vertical services in multiple data centers, optimization of Create, Retrieve, Update, Delete (CRUD) operations over the user data, through APIs, may be a challenging problem. The problem may be addressed, in most services, by using a subdomain style URI mapped directly to a particular service through a Domain Name System (DNS) and segmenting the APIs by particular service names. However, consumers who do not understand the segmenting of the APIs may not be able to use the services. That is, without a knowledge of seams of the services, a developer cannot develop programs to make use of the services.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a system may provide a global application program interface and routing to a number of services. An application program interface call may be received by a global traffic manager from an originating processing device via an open public network. The global traffic manager may determine a location associated with the originating processing device and may return an address of an edge server to an originating processing device. The edge server may be located closest to the originating processing device than any other edge server of the edge network. The originating processing device may then make the application program interface call to the edge server via the open public network. The edge server may obtain a data location having data associated with the application program interface call and may make a data center specific call, via a private backend network, to a data center corresponding to the obtained data location. Data may be obtained by a server within a server cluster of the data center and may be returned to the edge server via the private backend network. The edge server may ensure that the data is in a proper format and may send the data to the originating processing device via the open public network.

API data may be segmented by conceptual data type. A configuration server may maintain a mapping of data types or users to particular data centers, corresponding to backend APIs. Edge servers may receive configuration changes from the configuration server, via the private backend network, and may distribute the configuration changes to at least one other edge server of the edge network.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a system in which APIs may be segmented by conceptual data type. An API call may be received by a global traffic manager via a first network and the global traffic manager may determine an address of a server in an edge network located closest to an originator of the API call. The originator may then make the API call to the server via the first network. The server may parse a URI, included in the API call, in order to obtain a data type or an identifier. The identifier may be a user identifier, a group identifier, an event identifier, a network identifier, or other type of identifier. The server may send a request to an affinity lookup server for a location of data corresponding to the API call. The server may receive the location of the data from the affinity lookup server and may make a data center specific API call, via a private backend network, to a data center corresponding to the location of the data. In some embodiments, the location of the data received from the affinity lookup server may indicate a particular server cluster at a particular data center as having data corresponding to the API call.

The particular server cluster at the data center may receive the API call, may obtain the corresponding data, and may return the data to the server via the private backend network. The server may ensure that the returned data is in a proper format and may send the data to an originator of the API call in the proper format. Examples of formats, which may be used in embodiments consistent with the subject matter of this disclosure, may include Really Simple Syndication (RSS) feed, Atom Syndication Format (an XML language used for Web feeds), hypertext transfer protocol (HTTP), JavaScript Object Notation (JSON), Atom Publishing Protocol (APP), as well as other formats.

Exemplary Operating Environment

Figure 1:
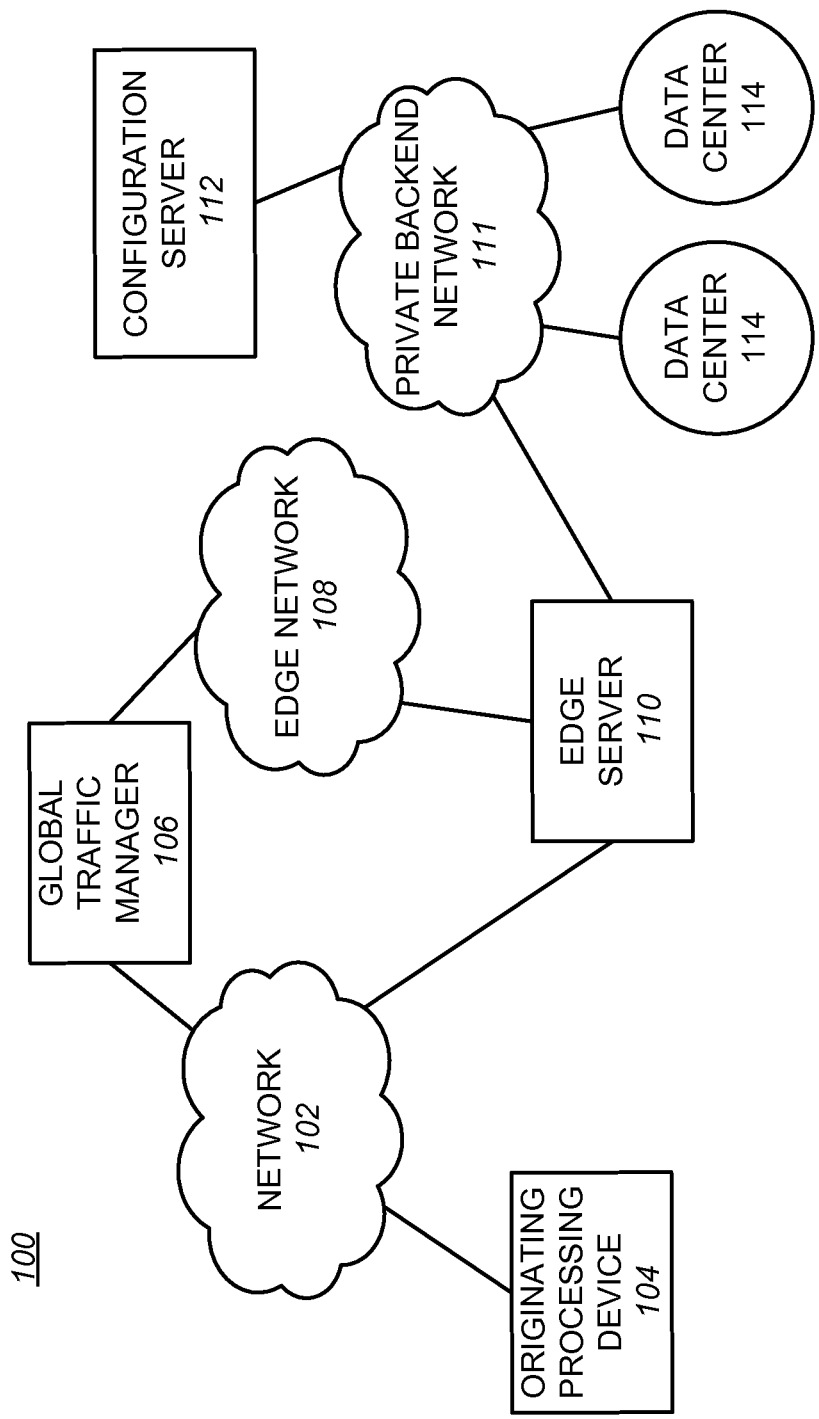
FIG. 1 illustrates an exemplary operating environment for embodiments consistent with the subject matter of this disclosure.

FIG. 1 illustrates an exemplary operating environment 100 for embodiments consistent with the subject matter of this disclosure. Exemplary operating environment 100 may include a network 102, an originating processing device 104, a global traffic manager 106, an edge network 108, an edge server 110, a private backend network 111, a configuration server 112, and multiple data centers 114.

Network 102 may be an open public network, such as, for example, the Internet, a Public Switched Telephone Network (PSTN), a Public Switched Digital Network (PSDN), any other type of open public network, or any combination of the above.

Originating processing device 104 may be a user's processing device, or any other type of processing device, including but not limited to a handheld processing device, a laptop personal computer (PC), or a desktop PC.

Global traffic manager 106 may be a processing device which provides a service that manages a DNS for network resources (for example, URIs). An API call may include a URI. Global traffic manager 106 may receive an API call, which may be a HyperText Transfer Protocol (HTTP) request, or another type of request, from originating processing device 104, and may determine the location of originating processing device 104 based on a network address associated with originating processing device 104. The network address may be included in a header of a message including the API call. When global traffic manager 106 receives the API call, global traffic manager 106 may determine an address of edge server 110 located closest to originating processing device 104 than any other edge server. Global traffic manager 106 may then return the address of edge server 110 to originating processing device 104, which originated the API call.

Edge network 108 may be a private network having computing power distributed across a large geographic area. In one embodiment, edge network 108 may have globally distributed computing power. Edge network 108 may include a number of backbone links for communication among various components of edge network 108.

Edge server 110 may receive an API call from originating processing device 104 after global traffic manager 106 received an API call from originating processing device 104 and returned an address of a closest edge server 110 to originating processing device 104. Edge server 110 may send a request for a data location of data corresponding to the API call via private backend network 111, may receive the data location of the data corresponding to the API call via private backend network 111, may make a data center specific API call, via private backend network 111, to data center 114 corresponding to the received data location, may receive, via private backend network 111, the data corresponding to the API call, may place the data in a proper format, and may send the data to originating processing device 104 via network 102.

Configuration server 112 may include a mapping of data types or users to particular data centers 114, corresponding to backend APIs. In some embodiments, edge server 110 may periodically poll configuration server 112 for configuration changes, such as, for example, updates, additions, or deletions. When edge server 110 receives a configuration change from configuration server 112, edge server 110 may store the configuration changes into a local cache and may distribute the configuration changes to at least one other edge server.

Operating environment 100 is exemplary. In various embodiments, multiple originating processing devices 104 may be connected to network 102 and multiple edge servers 110 may be connected to network 102, edge network 108, and private backend network 111. Further, operating environments may include one or multiple global traffic managers 106, connected to both network 102 and edge network 108, and one or multiple configuration servers 112 connected to private backend network 111. The operating environments may further include a number of data centers 114 connected to private backend network 111.

Figure 2:
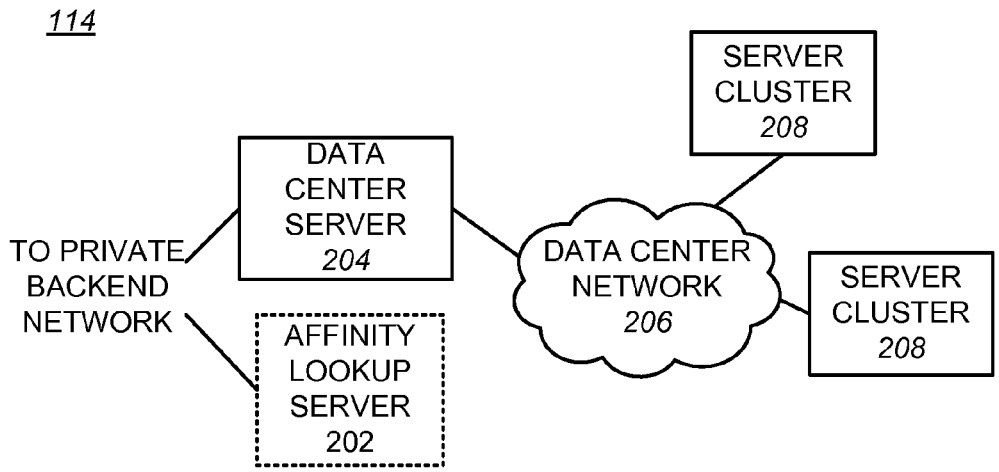
FIG. 2 illustrates an exemplary data center.

FIG. 2 illustrates an exemplary data center 114 in embodiments consistent with the subject matter of this disclosure. The data center 114 may include an affinity lookup server 202, a data center server 204, a data center network 206, and a number of server clusters 208.

In some embodiments consistent with the subject matter of this disclosure, affinity lookup server 202 may be included in only one data center 114. In other embodiments, affinity lookup server 202 may be included in multiple data centers 114. Affinity lookup server 202 may receive, from edge server 110, a request for a data location corresponding to data for an API call. The API call may include a data type or an identifier, and a resource identifier. Affinity lookup server 202 may determine the data location corresponding to data for the API call based on the data type or the identifier, and the resource identifier, and may send the determined data location to edge server 110. The data location may indicate a particular server cluster, which includes the data corresponding to the API call, within one of data centers 114.

Data center server 204 may receive a data center specific API call from edge server 110 and may forward the data center specific API call to one of server clusters 208 via data center network 206. Data center network 206 may be a local area network, or other type of network. A number of server clusters 208 may be included in data center 114 and connected to data center network 206.

Data center 114 of FIG. 2 is only exemplary. For example, FIG. 2 illustrates data center 114 as having only two server clusters 208. However, any number of server clusters 208 may be included within the data center 114. Similarly, FIG. 2 shows data center 114 as having only one data center server 204. However, multiple data center servers 204 may be included within data center 114 and connected to private backend network 111.

Exemplary Processing Device

Figure 3:
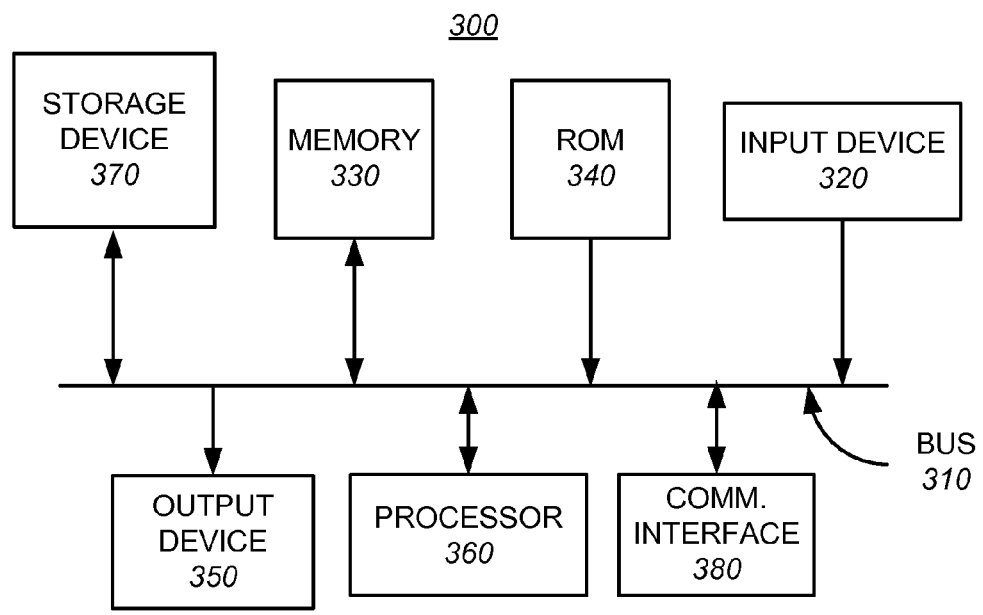
FIG. 3 is a functional block diagram illustrating an exemplary processing device, which may be used in implementations consistent with subject matter of this disclosure.

FIG. 3 is a functional block diagram of an exemplary processing device 300, which may be used to implement originating processing device 104, global traffic manager 106, edge server 110, configuration server 112, affinity lookup server 202, data center server 204, and/or servers within server cluster 208 in embodiments consistent with the subject matter of this disclosure. Processing device 300 may be a desktop personal computer (PC), a laptop PC, a handheld processing device, or other processing device. Processing device 300 may include a bus 310, an input device 320, a memory 330, a read only memory (ROM) 340, an output device 350, a processor 360, a storage device 370, and a communication interface 380. Bus 310 may permit communication among components of processing device 300.

Processor 360 may include at least one conventional processor or microprocessor that interprets and executes instructions. Memory 330 may be a random access memory (RAM) or another type of dynamic storage device that stores information and instructions for execution by processor 360. Memory 330 may also store temporary variables or other intermediate information used during execution of instructions by processor 360. ROM 340 may include a conventional ROM device or another type of static storage device that stores static information and instructions for processor 360. Storage device 370 may include compact disc (CD), digital video disc (DVD), a magnetic medium, or other type of storage device for storing data and/or instructions for processor 360.

Input device 320 may include a keyboard or other input device. Output device 350 may include one or more conventional mechanisms that output information, including one or more display monitors, or other output devices. Communication interface 380 may include a transceiver for communicating via one or more networks via a wired, wireless, fiber optic, or other connection.

Processing device 300 may perform such functions in response to processor 1360 executing sequences of instructions contained in a tangible machine-readable medium, such as, for example, memory 330, ROM 340, storage device 370 or other medium. Such instructions may be read into memory 330 from another machine-readable medium or from a separate device via communication interface 380.

Exemplary Processes

Figure 4:
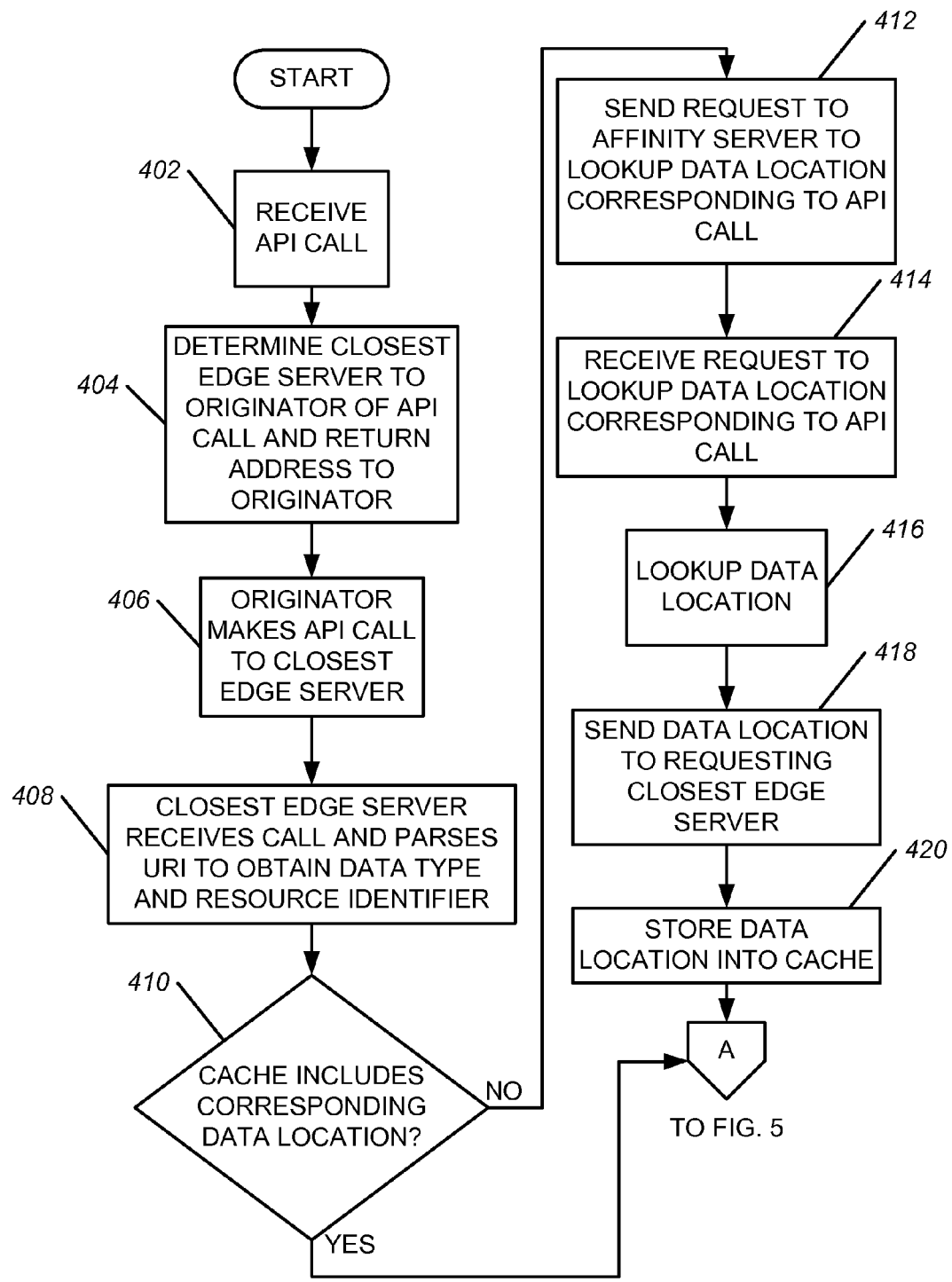
FIGS. 4 and 5 are flowcharts for explaining exemplary processing which may be implemented in embodiments consistent with the subject matter of this disclosure.

FIG. 4 is a flowchart illustrating an exemplary process for receiving an API call and returning data corresponding to the API call. The process may begin with global traffic manager 106 receiving an API call from originating processing device 104 via network 102 (act 402). The API call may be in HTTP format and may include a data type or an identifier, and a resource identifier, which may identify a requested resource. For example, an API call in HTTP format may have a structure, such as, for example, "http://api.live.com/<resource ID>/<data type/identifier>", where "api.live.com" is an exemplary URI, <resource ID> is a resource identifier, <data type> is a conceptual data type, and <identifier> may be an identifier that identifies a user, a group, an event, or a network.

Global traffic manager 106 may then determine a closest edge server, from among a number of edge servers, located closest to originating processing device 104 and may return an address of the closest edge server to originating processing device 104 (act 404). Global traffic manager 106 may determine the closest edge server by obtaining a network address, such as, for example, and Internet Protocol (IP) address, or other type of address associated with originating processing device 104. The address may be included in a header of a message including an API call. Global traffic manager 106 may perform a reverse address lookup to determine a location of originating processing device 104. Originating processing device 104 may then make the API call to edge server 110 located closest to originating processing device 104 (act 406).

Edge server 110 may receive the API call and may parse a URI to obtain a data type and a resource identifier (act 408). Edge server 110 may then determine whether a local cache includes a data location corresponding to the API call (act 410). Edge server 110 may determine whether the local cache includes the data location by accessing the local cache to determine whether the data location corresponding to an API for the obtained data type or identifier, and the obtained resource identifier is stored in the local cache.

If, during act 410, edge server 110 determines that the local cache does not include the data location corresponding to the API call, then edge server 110 may send a request to affinity lookup server 202, via private backend network 111, to look up a data location corresponding to the API call (act 412). Affinity lookup server 202 may then receive the request from edge server 110 (act 414) and may look up the data location (act 416). The data location may include an address for a particular data center and a particular server cluster within the particular data center. Affinity lookup server 202 may then send, via private backend network 111, a response, including the data location, to requesting edge server 110 (act 418), which may store the received data location into the local cache (act 420).

Figure 5:
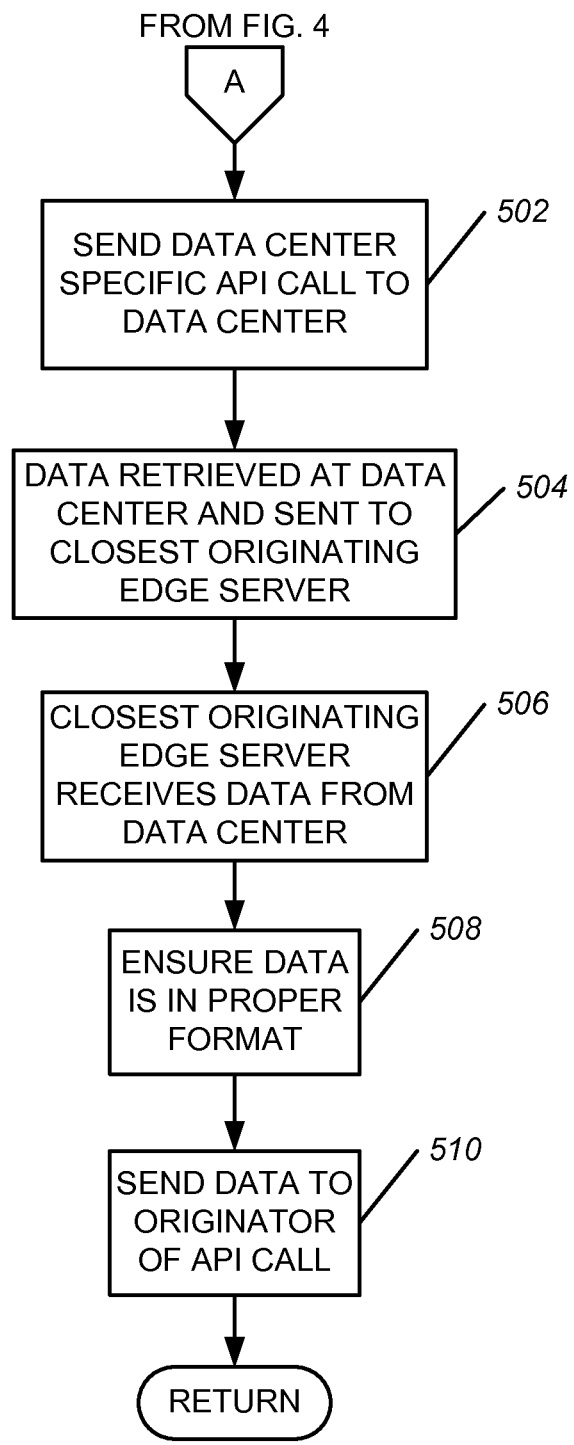

After performing act 420, or after performing act 410 and determining that the local cache does include a data location corresponding to the API call, edge server 110 may send a data center specific API call to data center 114, as indicated by the data location (act 502; FIG. 5). Data may be retrieved at data center 114 and may be sent to edge server 110 (located closest to originating processing device 104) via private backend network 111 (act 504). For example, data center server 204 may receive the data center specific API call and may forward the call to a particular server cluster 208 via data center network 206. Particular server cluster 208 may return the data to data center server 204, via data center network 206, which, in turn, may send the data, via private backend network 111, to edge server 110 (located closest to originating processing device 104).

Edge server 110 may receive the data from data center 114 (act 506) and may ensure that the data is in a proper format for originating processing device 104 (act 508). The proper format expected by originating processing device 104 may be indicated within a header of a message including the API call. If the data is not in the proper format, then edge server 110 may convert the data to the proper format. Edge server 110 may then send the data to originating processing device 104 via network 102 (act 510).

Figure 6:
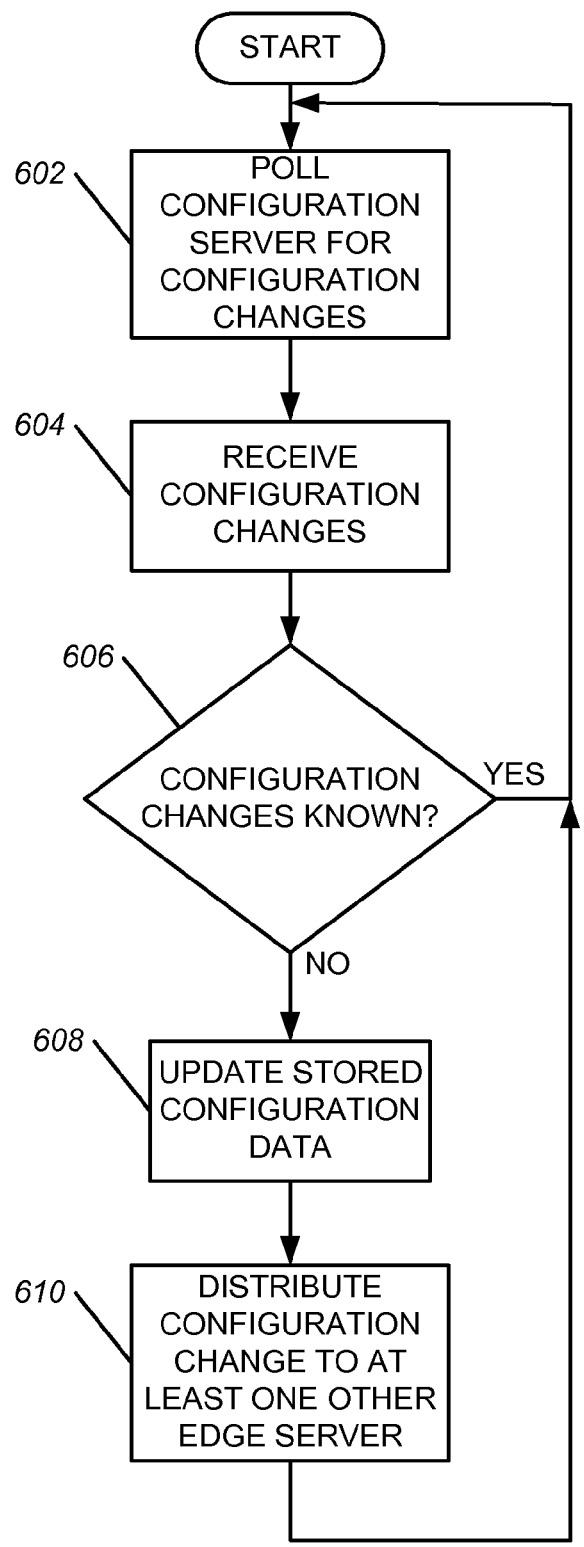
FIG. 6 is a flowchart for explaining exemplary processing regarding an edge server obtaining configuration changes from a configuration server and disseminating the configuration changes.

FIG. 6 is a flowchart illustrating an exemplary process for processing configuration changes received by edge server 110 from configuration server 112. The process may begin with edge server 110 periodically polling configuration server 112 (act 602). Edge server 110 may then receive configuration changes from configuration server 112 in response to the polling (act 604). Edge server 110 may then determine whether the received configuration changes are already known to edge server 110 (act 606). If the configuration changes are already known to edge server 110, then edge server 110 may repeat act 602-606. Otherwise, edge server 110 may update stored configuration data (act 608) and may distribute the received configuration changes to at least one other edge server 110 in edge network 108 (act 610). Edge server may then repeat acts 602-610.

Figure 7:
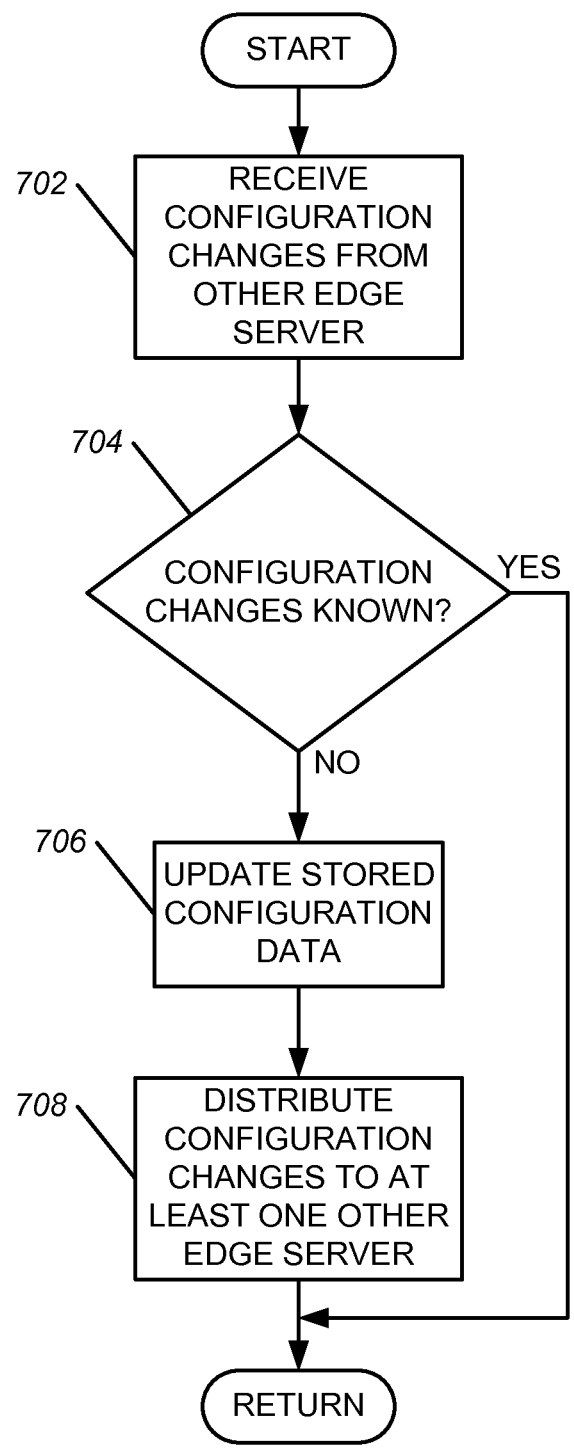
FIG. 7 is a flowchart for explaining exemplary processing regarding an edge server receiving configuration changes from another edge server and distributing the configuration changes.

FIG. 7 is a flowchart illustrating an exemplary process, which may be executed in edge server 110, when configuration changes are received from another edge server. The process may begin with edge server 110 receiving configuration changes from another edge server (act 702). Edge server 110 may then determine whether the received configuration changes are known to edge server 110 (act 704). If the changes are known to edge server 110, then the process is complete. Otherwise, edge server 110 may update stored configuration data (act 706). Edge server 110 may then distribute the configuration changes to at least one other edge server in edge network 108.

The embodiments described above provide an end-to-end design that enables dynamic mapping of disparate data storage endpoints, provides flexibility in incorporating new data types through a configuration-based architecture, and provides a geo-scalable, edge-hosted solution that scales out rapidly.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the scope of the invention, rather than any specific examples given.

We claim:

1. A machine-implemented method for serving remote application program interface calls, the machine-implemented method comprising:
   receiving from a remote computing device, at an intermediary server device, a request for data made via a remote application program interface call;
   transmitting, from the intermediary server device to a lookup server via a private backend network, a request for an address of a data center that serves data corresponding to the requested data;
   receiving, at the intermediary server device, the address of the data center that serves the corresponding data;
   transmitting, by the intermediary server device via the private backend network, a data center specific call to the address of the data center;
   in response to the data center specific call, receiving a response from the data center, the response from the data center including the corresponding data; and
   transmitting a response to the request for the data to the remote computing device, wherein the response to the request for the data is based on the corresponding data received from the data center.

2. The machine-implemented method of claim 1, further comprising:
   caching, by the intermediary server device, the received address of the data center;
   receiving, from the remote computing device, at the intermediary server device, another request for data made via another remote application program interface call from the remote computing device;
   determining, by the intermediary server device, that the address of the data center that serves data corresponding to the other requested data is included in a cache of the intermediary server device;
   transmitting, by the intermediary server device, another data center specific call to the cached address of the data center;
   in response to the other data center specific call, receiving another response from the data center; and
   transmitting a response to the other request for the data to the remote computing device.

3. The machine-implemented method of claim 1, further comprising:
   checking, by the intermediary server device, that the corresponding data received from the data center is in a specified format before transmitting the response to the request for the data to the remote computing device.

4. The machine-implemented method of claim 1, wherein the address of the data center that serves the data corresponding to the requested data is determined by a lookup server based on a type of the data requested by the remote computing device.

5. The machine-implemented method of claim 1, wherein the address of the data center that serves data corresponding to the requested data is determined by a lookup server based on an identifier associated with the remote computing device.

6. The machine-implemented method of claim 1, wherein:
   the request for data made via a remote application program interface call includes a user identifier; and
   the received address of the data center is based on the user identifier.

7. The machine-implemented method of claim 1, wherein the request for the data made via a remote application program interface was made to the intermediary server device based on a reverse lookup of a network address of the remote computing device.

8. A computer-readable memory having instructions stored therein for performing operations, the operations including:
   receiving, via a network, a remote application program interface call from an originating processing device;
   transmitting a request to a lookup server, via a private backend network, for an address of a data center server that enables servicing of the remote application program interface call;
   receiving the address of the data center server;
   transmitting a data center specific request, via the backend network, to the received address;
   in response to the data center specific call, receiving data associated with the remote application program interface call; and
   responding to the remote application program interface call based on the received data.

9. The computer-readable memory of claim 8, wherein the operations further comprise:
   formatting the received data based on a format associated with the originating processing device.

10. The computer-readable memory of claim 8, wherein the operations further comprise:
    polling a configuration data server via the private backend network for configuration data updates; and
    forwarding received configuration data updates.

11. The computer-readable memory of claim 8, wherein the operations further comprise:
    storing the received address into a cache; and
    transmitting a second data center specific remote application program interface call to the cached address as part of servicing a second remote application program interface call.

12. The computer-readable memory of claim 8, wherein:
    the operations further comprise parsing a uniform resource indicator included in the remote application program interface call for a data type and resource identifier; and
    transmitting the data center specific request includes transmitting the data type and the resource identifier to the received address.

13. The computer-readable memory of claim 8, wherein responding to the remote application program interface call includes responding to the remote application program interface call via a public network.

14. A server computing device that services remote application program interface calls, comprising:
a memory and a processor that are respectively configured to store and execute instructions, including instructions for:
receiving a data request made via a remote application program interface call;
transmitting, via a private backend network, a request for an address of a data server having data for servicing the data request;
receiving the address of the data server that has the data for servicing the data request;
transmitting, via the private backend network, a call to the data server at the received address;
receiving a response from the data server that includes the data for servicing the data request; and
transmitting a response to the data request that is based on the response from the data server.

15. The server computing device of claim 14, wherein the instructions include additional instructions for:
caching the address of the data server;
receiving another data request made via another remote application program interface call;
determining that the data server has additional data for servicing the other data request;
transmitting a data center specific call to the cached address of the data server;
receiving a response to the data center specific call from the data server; and
transmitting a response to the other data request.

16. The server computing device of claim 14, wherein the instructions include additional instructions for:
formatting at least a portion of the response from the data server into a response format associated with the remote application program interface call.

17. The server computing device of claim 14, wherein the address of the data server that has the data for servicing the data request is determined based on a type of the data requested via the remote application program interface call.

18. The server computing device of claim 14, wherein the address of the data server that has the data for servicing the data request is determined based on an identifier associated with the remote application program interface call.

19. The server computing device of claim 14, wherein:
the data request made via a remote application program interface call includes a user identifier; and
the received address is based on the user identifier.

20. The server computing device of claim 14, wherein server computing device was selected from a plurality of server computing devices based on a reverse lookup of a network address of the remote computing device.

* * * * *